US012633674B2

(12) United States Patent
Kang et al.

(10) Patent No.: US 12,633,674 B2
(45) Date of Patent: May 19, 2026

(54) ANTENNA APPARATUS FOR VEHICLE AND RADAR SYSTEM AND VEHICLE INCLUDING THE SAME

(71) Applicant: HL Klemove Corp., Incheon (KR)

(72) Inventors: Yun Su Kang, Suwon-si (KR); Beom Sic Yoo, Yongin-si (KR)

(73) Assignee: HL KLEMOVE CORP., Incheon (KR)

( * ) Notice: Subject to any disclaimer, the term of this patent is extended or adjusted under 35 U.S.C. 154(b) by 243 days.

(21) Appl. No.: 18/116,151

(22) Filed: Mar. 1, 2023

(65) Prior Publication Data

US 2023/0282988 A1 Sep. 7, 2023

(30) Foreign Application Priority Data

Mar. 2, 2022 (KR) ........................ 10-2022-0026586

(51) Int. Cl.
*H01Q 1/32* (2006.01)
*H01Q 21/06* (2006.01)

(52) U.S. Cl.
CPC ............. *H01Q 21/064* (2013.01); *H01Q 1/32* (2013.01)

(58) Field of Classification Search
CPC ...... H01Q 21/064; H01Q 1/32; H01Q 21/005; H01Q 1/3233; H01Q 1/3283; H01Q 1/38; H01Q 1/325; H01Q 19/15; H01Q 13/20; H01Q 21/0031; H01Q 21/0037; H01Q 21/0043
USPC ................................ 361/764, 748, 760, 814
See application file for complete search history.

(56) References Cited

U.S. PATENT DOCUMENTS 3,964,069 A * 6/1976 McDonough ...... H01Q 21/0031 343/754
5,649,316 A * 7/1997 Prudhomme ....... B60R 11/0241 343/807
6,272,349 B1 * 8/2001 McGrath .................. H04B 1/18 455/345
8,525,737 B2 * 9/2013 Rho ..................... H01Q 9/0421 343/702
10,082,570 B1 * 9/2018 Izadian .................. H01Q 13/06
10,700,440 B1 * 6/2020 Taveniku ........... H01Q 21/0093
10,854,964 B2 * 12/2020 Kim ..................... H01Q 1/3275
11,664,360 B2 * 5/2023 Nguyen ................. H05K 1/183 361/748

(Continued)

FOREIGN PATENT DOCUMENTS

KR 10-2011-0025547 A 3/2011
KR 10-2015-0059392 A 6/2015

(Continued)

OTHER PUBLICATIONS

Korean Office Action dated Mar. 29, 2023 for corresponding Korean Patent Application No. 10-2022-0026586, 4 pages.

*Primary Examiner* — Dameon E Levi
*Assistant Examiner* — Jordan E. DeWitt
(74) *Attorney, Agent, or Firm* — Hauptman Ham, LLP

(57) ABSTRACT

An vehicle antenna apparatus is disclosed. An vehicle antenna apparatus according to an aspect of the present invention may be a vehicle antenna apparatus for transmitting and receiving radio waves, comprising: a printed circuit board provided in a vehicle; a subprocessor mounted on the printed circuit board; and an antenna module electrically connected to the subprocessor, covering a portion of the printed circuit board and mounted on one surface of the printed circuit board.

14 Claims, 13 Drawing Sheets

(56) References Cited

U.S. PATENT DOCUMENTS

| | | | | |
|---|---|---|---|---|
| 12,176,610 | B1 * | 12/2024 | Yao | H01P 5/107 |
| 2004/0008498 | A1 * | 1/2004 | Tanaka | G06K 19/0726 361/764 |
| 2006/0132374 | A1 * | 6/2006 | Wang | H01Q 21/005 343/770 |
| 2010/0225561 | A1 * | 9/2010 | Lee | H04N 21/414 343/906 |
| 2011/0025435 | A1 * | 2/2011 | Gorbachov | G06F 30/367 716/102 |
| 2012/0142397 | A1 * | 6/2012 | Jordan | H01Q 9/42 455/556.1 |
| 2013/0147657 | A1 * | 6/2013 | Lee | G01S 7/032 228/180.5 |
| 2014/0340267 | A1 * | 11/2014 | Kim | H01Q 1/3275 343/713 |
| 2016/0007475 | A1 * | 1/2016 | Zanesi | B41J 2/01 427/98.5 |
| 2016/0211189 | A1 * | 7/2016 | Niessner | H01L 23/3128 |
| 2017/0033062 | A1 * | 2/2017 | Liu | H01L 23/66 |
| 2017/0324135 | A1 * | 11/2017 | Blech | H01Q 1/38 |
| 2017/0324138 | A1 * | 11/2017 | Talty | H01Q 13/20 |
| 2017/0324144 | A1 * | 11/2017 | Talty | H01Q 1/1271 |
| 2018/0026378 | A1 * | 1/2018 | Hadavy | H01Q 21/0087 343/771 |
| 2018/0366825 | A1 * | 12/2018 | Klemes | H01Q 21/20 |
| 2019/0057945 | A1 * | 2/2019 | Maaskant | H01P 11/002 |
| 2019/0104212 | A1 * | 4/2019 | Lee | H01Q 9/0435 |
| 2019/0113609 | A1 * | 4/2019 | Baheti | H01Q 9/0457 |
| 2019/0118737 | A1 * | 4/2019 | Li | H01P 5/12 |
| 2019/0363584 | A1 * | 11/2019 | Leem | H01Q 21/28 |
| 2020/0052390 | A1 * | 2/2020 | Ahmadloo | H01Q 21/065 |
| 2020/0168977 | A1 * | 5/2020 | Son | H04M 1/0277 |
| 2020/0194901 | A1 * | 6/2020 | Lynch | H01Q 13/206 |
| 2020/0287295 | A1 * | 9/2020 | Pernstål | H01Q 21/065 |
| 2020/0313279 | A1 * | 10/2020 | Kim | H01Q 21/08 |
| 2020/0313288 | A1 * | 10/2020 | Kona | H01Q 13/20 |
| 2020/0329556 | A1 * | 10/2020 | Baek | H01Q 1/246 |
| 2020/0363498 | A1 * | 11/2020 | Brown | H01P 5/107 |
| 2021/0175609 | A1 * | 6/2021 | Ryoo | H01Q 9/42 |
| 2021/0351499 | A1 * | 11/2021 | Ahmadloo | H01L 23/552 |
| 2021/0356682 | A1 * | 11/2021 | Shen | G02B 6/428 |
| 2022/0131571 | A1 * | 4/2022 | Lukyanov | H01Q 1/38 |
| 2022/0200163 | A1 * | 6/2022 | Li | H01P 5/028 |
| 2022/0302596 | A1 * | 9/2022 | Alexanian | H01Q 21/0031 |
| 2022/0328960 | A1 * | 10/2022 | Chen | H01Q 3/247 |
| 2022/0376384 | A1 * | 11/2022 | Hwang | H01Q 1/3208 |
| 2023/0027319 | A1 * | 1/2023 | Lee | H01P 3/121 |
| 2023/0144495 | A1 * | 5/2023 | Doyle | H01Q 1/525 343/771 |
| 2023/0247121 | A1 * | 8/2023 | Yun | H04B 1/0053 455/566 |
| 2023/0282988 | A1 * | 9/2023 | Kang | H01Q 1/3233 |
| 2024/0021996 | A1 * | 1/2024 | Yang | H01Q 9/0414 |
| 2024/0120662 | A1 * | 4/2024 | Lee | H01Q 21/0043 |
| 2024/0322442 | A1 * | 9/2024 | Lee | H01Q 13/0233 |
| 2024/0332791 | A1 * | 10/2024 | Tao | H01Q 9/40 |
| 2024/0413515 | A1 * | 12/2024 | Le | H01Q 1/1271 |
| 2025/0038412 | A1 * | 1/2025 | Liu | H01L 25/165 |
| 2025/0096475 | A1 * | 3/2025 | Alexanian | H01Q 21/005 |
| 2025/0105484 | A1 * | 3/2025 | Ikeda | H01P 3/123 |

FOREIGN PATENT DOCUMENTS

| | | | | |
|---|---|---|---|---|
| KR | 10-2019-0004120 A | | 1/2019 | |
| WO | WO-2012043573 A1 | * | 4/2012 | G02B 6/32 |

* cited by examiner

ANTENNA APPARATUS FOR VEHICLE AND RADAR SYSTEM AND VEHICLE INCLUDING THE SAME

CROSS-REFERENCE TO RELATED APPLICATION

This application is based on and claims priority under 35 U.S.C. § 119 to Korean Patent Application No. 10-2022-0026586, filed on Mar. 2, 2022 in the Korean Intellectual Property Office, the disclosure of which is incorporated herein by reference.

TECHNICAL FIELD

The present invention relates to an antenna apparatus for vehicle, and a radar system and a vehicle including the same, and more particularly, to a vehicle antenna apparatus capable of suppressing an interference effect between transmission/reception channels and having a high degree of design freedom, and a radar system and a vehicle including the same.

BACKGROUND ART

As the safety and convenience functions of vehicles for drivers, such as adaptive cruise control (ACC), autonomous emergency braking (AEB), autonomous driving and autonomous parking, increase, the development of vehicle radar to grasp the situation around the vehicle is becoming active.

Such a vehicle radar requires an array antenna that radiates radio wave signals in order to transmit and receive radio waves. Recently, research and use of a waveguide-type array antenna that can suppress an interference effect between transmission/reception channels and has a wide beam area are increasing.

Conventionally, in order to apply a waveguide array antenna to a vehicle radar, a waveguide and a power feeding network are formed on a metal plate, and then the metal plates are stacked in multiple layers on a printed circuit board.

However, although the waveguide for transmitting and receiving radio waves and the power feeding network suffice to be disposed only on one area of the printed circuit board, the conventional waveguide array antenna has been manufactured by stacking the metal plates having a size similar to that of the printed circuit board, resulting in unnecessary waste of resources and an increase in costs. In particular, as the size of the printed circuit board increases, the amount of raw materials required for manufacturing the antenna increases, resulting in a rapid increase in manufacturing cost.

In addition, conventionally, since a waveguide for transmission and a waveguide for reception were formed on one metal plate, and then the metal plates were stacked in multiple layers to form transmission/reception channel, the transmission/reception channel was integrally formed in one waveguide array antenna.

Accordingly, the conventional waveguide array antenna has a problem in that the structure, arrangement, shape, thickness, etc. of the transmission/reception channel cannot be freely changed, and thus, the degree of freedom in antenna design is lowered, and an interference effect between the transmission/reception channels occurs.

Furthermore, in the prior art, since the metal plates constituting the waveguide array antenna were manufactured in the same size as the printed circuit board, a large amount of lateral waves (lateral radiations) were generated by a frame in which the waveguide was not formed and a ground (GND) formed long in a lateral direction.

Accordingly, in the conventional waveguide array antenna, an additional structure such as a corrugated slot or a non-radiating slot was required to suppress the interference effect between the transmission/reception channels, or the lateral waves.

Therefore, it has been required to develop a vehicle antenna apparatus capable of suppressing the interference effect between transmission/reception channels, while having a high degree of design freedom and reducing manufacturing costs. In addition, it has been required to develop a vehicle antenna apparatus capable of effectively suppressing the lateral waves that may be generated by an unnecessary structure of the waveguide array antenna.

DISCLOSURE

Technical Problem

The present invention is to solve the above problems, and an object of the present invention is to provide a vehicle antenna apparatus capable of dramatically reducing manufacturing costs, and a radar system and a vehicle including the same.

In addition, another object of the present invention is to provide a vehicle antenna apparatus capable of increasing the degree of freedom in design of transmission/reception channels, and a radar system and a vehicle including the same.

In addition, still another object of the present invention is to provide a vehicle antenna apparatus capable of increasing space utilization inside a vehicle radar in which the antenna apparatus is installed, and a radar system and a vehicle including the same.

In addition, yet another object of the present invention is to provide a vehicle antenna apparatus capable of reducing an interference effect between transmission/reception channels, and a radar system and a vehicle including the same.

In addition, yet another object of the present invention is to provide a vehicle antenna apparatus capable of suppressing the generation of lateral waves in the process of transmitting and receiving radio wave signals, and a radar system and a vehicle including the same.

The objects of the present invention are not limited to the above-mentioned objects, and other objects not mentioned will be clearly understood by those skilled in the art from the following description.

Technical Solution

According to one aspect of the present invention, there is provided a vehicle antenna apparatus for transmitting and receiving radio waves, the vehicle antenna apparatus comprising: a printed circuit board provided in a vehicle; a subprocessor mounted on the printed circuit board; and an antenna module electrically connected to the subprocessor, covering a portion of the printed circuit board, and mounted on one surface of the printed circuit board.

In this case, one surface of the antenna module mounted on the printed circuit board may have a second area smaller than a first area of the printed circuit board.

In this case, the antenna module may be located inside the edge of the printed circuit board so as not to protrude to the side of the printed circuit board.

In this case, the antenna module and the subprocessor may be located on the one surface of the printed circuit board.

In this case, the subprocessor may be disposed in the center of the printed circuit board, and the antenna module may be arranged to be spaced apart from the subprocessor.

In this case, the number of antenna modules may be plural.

In this case, the plurality of antenna modules may include first and second antenna modules, wherein the first antenna module may be formed to have a thickness greater than that of the second antenna module.

In this case, the difference in thickness between the first and second antenna modules may be greater than or equal to twice (2λ) the wavelength (λ) of the radio wave.

In this case, the first antenna module may be an antenna module for transmission, and the second antenna module may be an antenna module for reception.

In this case, the antenna module may include: a module body mounted on the printed circuit board; a waveguide formed in the module body and having a plurality of slots formed along a longitudinal direction; and a power feeding network formed inside the module body to connect the waveguide and the subprocessor.

In this case, the number of waveguides may be plural, and the plurality of waveguides may be arranged adjacent to each other side by side.

In this case, the module body includes an inner part adjacent to the printed circuit board, and an outer part positioned farther away from the printed circuit board than the inner part; and the plurality of waveguides may be formed over the entire area of the outer part along the width direction of the module body.

In this case, the power feeding network is located in the inner part, and the width of the inner part may be smaller than or equal to the width of the outer part.

According to another aspect of the present invention, there is provided a radar system comprising: a vehicle antenna apparatus that can be installed in a vehicle to transmit and receive radio waves; and a power supply unit for supplying power to the antenna apparatus, wherein the antenna apparatus includes a printed circuit board provided in the vehicle; a subprocessor mounted on the printed circuit board; and an antenna module electrically connected to the subprocessor, covering a portion of the printed circuit board and mounted on one surface of the printed circuit board.

In this case, it may further include a main processor provided outside the antenna apparatus so as to be electrically connected to the subprocessor.

According to still another aspect of the present invention, there is provided a vehicle comprising: a vehicle body; and a vehicle antenna apparatus provided in the vehicle body to transmit and receive radio waves, wherein the antenna apparatus includes a printed circuit board provided in the vehicle body; a subprocessor mounted on the printed circuit board; and an antenna module electrically connected to the subprocessor, covering a portion of the printed circuit board and mounted on one surface of the printed circuit board.

In this case, the antenna apparatus may be provided in plurality, and the plurality of antenna apparatuses may be arranged to be spaced apart from each other along the circumference of the vehicle body.

In this case, the vehicle body includes a central part; and a plurality of corner parts protruding outward from the central part, and the plurality of antenna apparatuses may include a front antenna apparatus provided in a front part of the vehicle body; and a plurality of corner antenna apparatuses respectively provided in the plurality of corner parts.

Advantageous Effects

According to the above configuration, in the vehicle antenna apparatus according to an embodiment of the present invention and the vehicle including the same, the antenna module is mounted only in one area of the printed circuit board where the arrangement of the transmission/reception channel is required, whereby the manufacturing cost of the antenna apparatus can be drastically reduced.

In addition, in the vehicle antenna apparatus according to an embodiment of the present invention, and the radar system and vehicle including the same, the antenna apparatus includes a plurality of antenna modules whose structure, arrangement, shape, height, etc. can be freely changed, and these modules are used to configure the transmission/reception channels, whereby it is possible to increase the degree of freedom in the design of transmission/reception channels and to increase the space utilization inside the vehicle radar in which the antenna apparatus is installed.

Further, in the vehicle antenna apparatus according to an embodiment of the present invention, and the radar system and vehicle including the same, one surface of the antenna module mounted on the printed circuit board has a smaller area than the printed circuit board and is located inside the edge of the printed circuit board so as not to protrude to the side of the printed circuit board, whereby it is possible to increase the space utilization inside the vehicle radar in which the antenna apparatus is installed.

In addition, in the vehicle antenna apparatus according to an embodiment of the present invention, and the radar system and vehicle including the same, the antenna apparatus may include first and second antenna modules having different thicknesses, these modules may be used to configure the transmission/reception channels, thereby reducing an interference effect between transmission/reception channels.

In addition, in the vehicle antenna apparatus according to an embodiment of the present invention, and the radar system and vehicle including the same, the module body of the antenna module includes an inner part adjacent to the printed circuit board and an outer part positioned farther away from the printed circuit board than the inner part, and a plurality of waveguides is formed over the entire area of the outer part, whereby the generation of lateral waves can be effectively suppressed in the process of transmitting and receiving radio wave signals.

It should be understood that the effects of the present invention are not limited to the above effects, and include all effects that can be inferred from the configuration of the invention described in the detailed description or claims of the present invention.

DESCRIPTION OF DRAWINGS

FIGS. 7A and 7B are diagrams for explaining a first experiment confirming that the vehicle antenna apparatus shown in FIG. 1 can reduce an interference effect between transmission/reception channels, wherein FIG. 7A is a schematic view of first and second experimental models modeling the vehicle antenna apparatus shown in FIG. 1, and FIG. 7B is a graph showing the experimental results of the first experiment.

FIGS. 8A to 10 are diagrams for explaining a second experiment confirming that the vehicle antenna apparatus shown in FIG. 1 can suppress lateral waves, wherein FIGS. 8A to 8C is schematic diagrams of a third experimental model modeling the vehicle antenna apparatus shown in FIG. 1 and first and second comparison models; FIG. 10 is a graph showing the experimental results of the second experiment.

BEST MODES OF THE INVENTION

Figure 1:
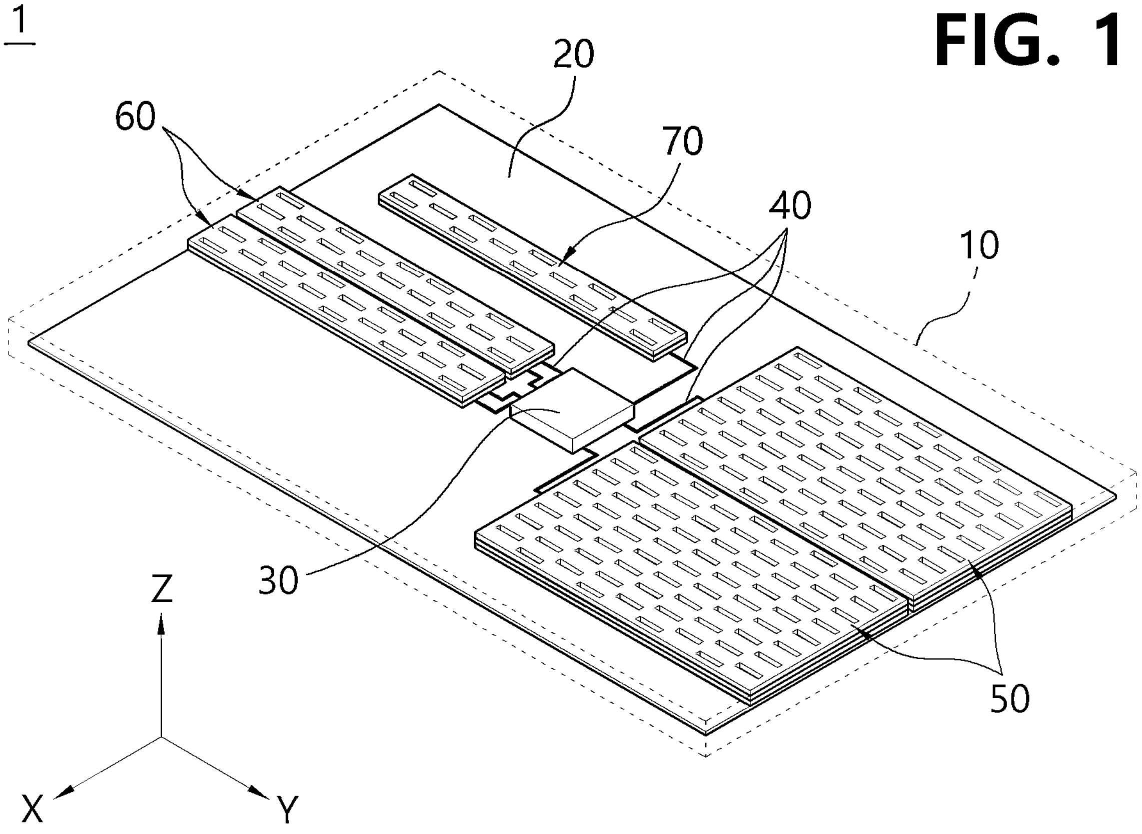
FIG. 1 is a perspective view of an antenna apparatus for a vehicle according to an embodiment of the present invention. For the purpose of describing the invention, the housing is indicated by a dotted line, and the components seen through the housing are indicated by a solid line.

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention, parts irrelevant to the description are omitted from the drawings; and throughout the specification, same or similar components are referred to as like reference numerals.

The words and terms used in the specification and claims of the present application are not to be construed as being limited to their ordinary or dictionary meanings, but should be interpreted as meanings and concepts consistent with the technical spirit of the present invention, based on the principle that the inventor may define terms and concepts to best describe his invention.

In the specification, terms such as “comprise” or “have” are intended to explain that a feature, number, step, operation, component, part or combination thereof described in the specification is present, but should not be construed to preclude the possibility of the presence or addition of one or more other features, numbers, steps, operations, components, parts or combinations thereof.

When a component is said to be “before”, “after”, “above” or “below” another component, it includes a case in which the component is placed “before”, “after”, “above” or “below” another component so as to be in direct contact with each other, as well as a case where any additional component is disposed between the two components, unless there are special circumstances. In addition, when a component is said to be “connected” to another component, it includes cases where they are not only directly connected to each other but also indirectly connected to each other, unless there are special circumstances.

In the following description of the drawings, each direction is defined and described based on FIG. 1. More specifically, a positive direction of the y-axis is defined as forward, and a negative direction of the y-axis is defined as backward. A positive direction of the z-axis is defined as upward, and a negative direction of the z-axis is defined as downward. A positive direction of the x-axis is defined as right side, and a negative direction of the x-axis is defined as left side.

An embodiment of the present invention relates to a vehicle antenna apparatus installed inside a vehicle radar provided in a vehicle to receive radio wave signals from the outside of the vehicle or transmit radio wave signals to the outside of the vehicle.

In the vehicle antenna apparatus according to an embodiment of the present invention, an antenna module without particular limitations on structure, arrangement, shape, thickness, etc. can be mounted while covering a portion of a printed circuit board, thereby reducing manufacturing cost and providing high design freedom and space utilization.

In addition, the vehicle antenna apparatus according to an embodiment of the present invention includes a plurality of antenna modules having different thicknesses, and a waveguide is formed over the entire outer area of the antenna module body, whereby an interference effect between transmission/reception channels can be reduced and generation of lateral waves can be suppressed in the process of transmitting and receiving radio wave signals.

In this embodiment, a vehicle radar refers to a apparatus or system that detects the position or movement of other moving or stationary vehicles or objects in order to perform adaptive cruise control (ACC), autonomous emergency braking (AEB), autonomous driving and autonomous parking of the vehicle, but is not limited thereto.

In this embodiment, the vehicle antenna apparatus refers to a apparatus or system that can be installed inside a vehicle radar to transmits a radio wave signal toward other vehicles or objects, or to receive a radio wave signal reflected from other vehicles or objects, and to interpret the transmitted/received radio wave signals, but is not limited thereto.

The vehicle antenna apparatus according to the present invention is not limited to the antenna apparatus for a vehicle radar that transmits and receives radio wave signals to detect other vehicles or objects as described above, and can be applied to various apparatuses capable of transmitting, receiving and interpreting radio wave signals in order to perform certain functions.

Figure 2:
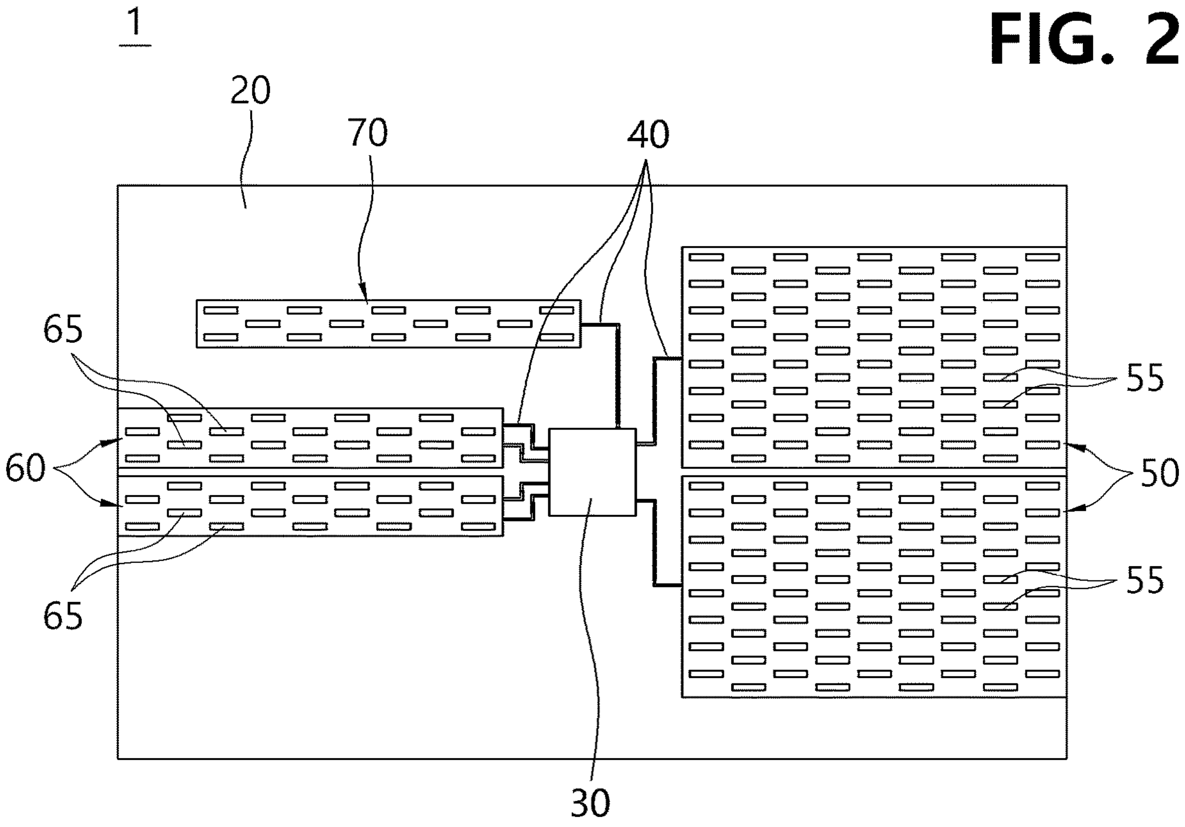
FIG. 2 is a plan view of the vehicle antenna apparatus shown in FIG. 1.

FIG. 1 is a perspective view of an antenna apparatus for a vehicle according to an embodiment of the present invention. For the purpose of describing the invention, the housing is indicated by a dotted line, and the components seen through the housing are indicated by a solid line. FIG. 2 is a plan view of the vehicle antenna apparatus shown in FIG. 1.

Referring to FIG. 1, a vehicle antenna apparatus 1 according to an embodiment of the present invention may include a housing 10, a printed circuit board 20, a subprocessor 30, a power feeding circuit 40, and antenna modules 50, 60 and 70.

The housing 10 accommodates and protects the printed circuit board 20, the subprocessor 30, the power feeding circuit 40, and the antenna modules 50, 60 and 70. In this embodiment, the housing 10 has a box shape having a rectangular parallelepiped shape, but the shape of the housing 10 may be varied in various ways depending on the shape and arrangement of other components accommodated therein and the function performed by the vehicle antenna apparatus 1.

The printed circuit board 20 is provided inside the housing 10. The subprocessor 30 and the antenna modules 50, 60, and 70 are mounted on the printed circuit board 20. In this embodiment, the subprocessor 30 is disposed in the center of the upper surface of the printed circuit board 20, and the antenna modules 50, 60 and 70 are arranged to be spaced apart from the subprocessor 30 at a predetermined distance.

The power feeding circuit 40 is formed on the printed circuit board 20. The power feeding circuit 40 may perform a function of electrically connecting the subprocessor 30 and the antenna modules 50, 60 and 70 mounted on the printed circuit board 20.

To this end, both ends of the power feeding circuit 40 may be connected to the subprocessor 30 and the antenna modules 50, 60 and 70, respectively, to transmit an electrical signal from the subprocessor 30 to the antenna modules 50, 60, and 70 or vice versa.

Although not illustrated, the power feeding circuit 40 may be provided with a transition unit in which electrical conversion is performed from a power supply line on a circuit board to a waveguide, passive elements for power distribution, and various known components for performing the function of an antenna.

Referring to FIGS. 1 and 2, in this embodiment, the antenna modules 50, 60 and 70 have a rectangular parallelepiped shape having a predetermined thickness and a larger width and length than the thickness. A plurality of slots 55, 65 and 75 communicating with the inside are formed in the antenna modules 50, 60 and 70.

In the process of transmitting and receiving radio wave signals, the antenna modules 50, 60 and 70 perform a function of transmitting radio wave signals transmitted and generated by the power feeding circuit 40 to the outside through a plurality of slots 55, 65 and 75, or receiving radio wave signals from the outside through a plurality of slots 55, 65 and 75 and transmit them to the power feeding circuit 40 and the subprocessor 30.

Meanwhile, the shapes of the antenna modules 50, 60 and 70 may be appropriately changed depending on the shape of the printed circuit board 20, the nature of radio wave signals, and the shape of a space in which the vehicle antenna apparatus 1 is installed.

The antenna modules 50, 60 and 70 are mounted on the printed circuit board 20 while covering a portion of the upper surface of the printed circuit board 20. As described above, in the vehicle antenna apparatus 1 according to an embodiment of the present invention, since the antenna modules 50, 60 and 70 cover only a portion of the printed circuit board 20, the antenna modules 50, 60 and 70 and the subprocessor 30 can be mounted on the same surface of the printed circuit board 20.

More specifically, according to this embodiment, the subprocessor 30 can be mounted on one surface of the printed circuit board 20 that is not covered by the antenna modules 50, 60 and 70. In addition, electronic elements (not shown) performing other functions may be mounted on one surface of the printed circuit board which is not covered by the antenna modules 50, 60 and 70.

As described above, according to the present embodiment, since the antenna modules 50, 60 and 70, the subprocessor 30, and other components can be disposed together on the same surface of the printed circuit board 20, the internal space of the vehicle radar provided with the antenna apparatus 1 can be efficiently utilized.

In addition, according to the present embodiment, since the antenna modules 50, 60 and 70 cover only a portion of the printed circuit board 20 without covering the entire area of the printed circuit board 20, the amount of resources required for manufacturing can be reduced, and manufacturing costs can be drastically reduced.

Meanwhile, referring to FIGS. 1 and 2, the vehicle antenna apparatus 1 according to an embodiment of the present invention may include a plurality of antenna modules 50, 60 and 70. In this embodiment, the plurality of antenna modules 50, 60 and 70 are comprised of a first antenna module 50, a second antenna module 60, and a third antenna module 70, which perform different functions.

In this case, the power feeding circuit 40 is configured to correspond to the plurality of antenna modules 50, 60 and 70. More specifically, the power feeding circuit 40 is comprised of a plurality of circuits electrically connecting each of the plurality of antenna modules 50, 60 and 70 to the subprocessor 30.

In this embodiment, one surface of the antenna modules 50, 60 and 70 mounted on the printed circuit board 20 has an area smaller than that of the printed circuit board 20. That is, the plurality of antenna modules 50, 60 and 70 may be mounted together on one surface of one printed circuit board 20. In addition, the antenna modules 50, 60 and 70 are located inside the edge of the printed circuit board 20 so as not to protrude to the side of the printed circuit board 20.

Accordingly, in the vehicle antenna apparatus 1 according to an embodiment of the present invention, the antenna modules 50, 60 and 70 can be compactly configured on the same surface of the printed circuit board 20, thereby increasing the efficiency of the internal space of the vehicle radar where the antenna apparatus 1 is installed.

Figure 3:
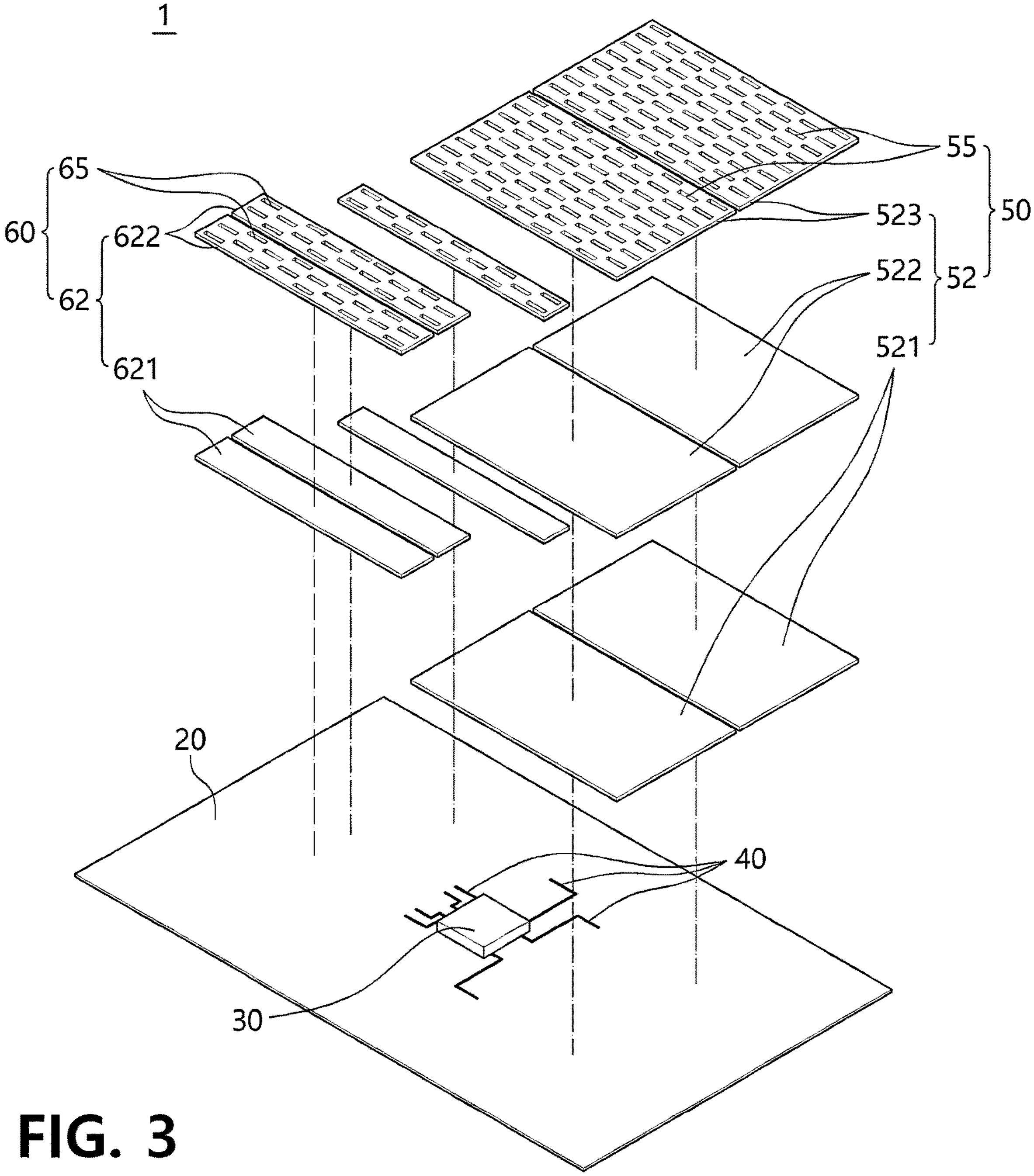
FIG. 3 is an exploded perspective view of the vehicle antenna apparatus shown in FIG. 1.
Figure 4:
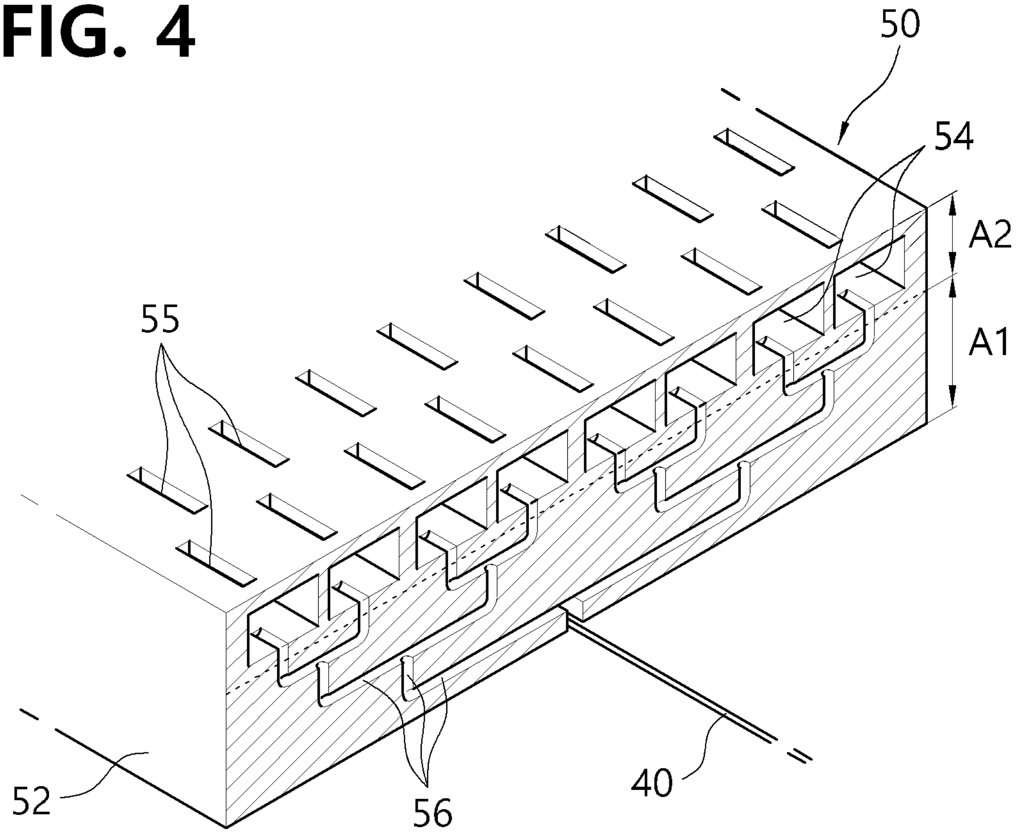
FIG. 4 is a perspective view of a first antenna module and a power feeding circuit of the vehicle antenna apparatus shown in FIG. 1. Here, the first antenna module is cut so that a waveguide and a power feeding network formed therein can be seen.
Figure 5:
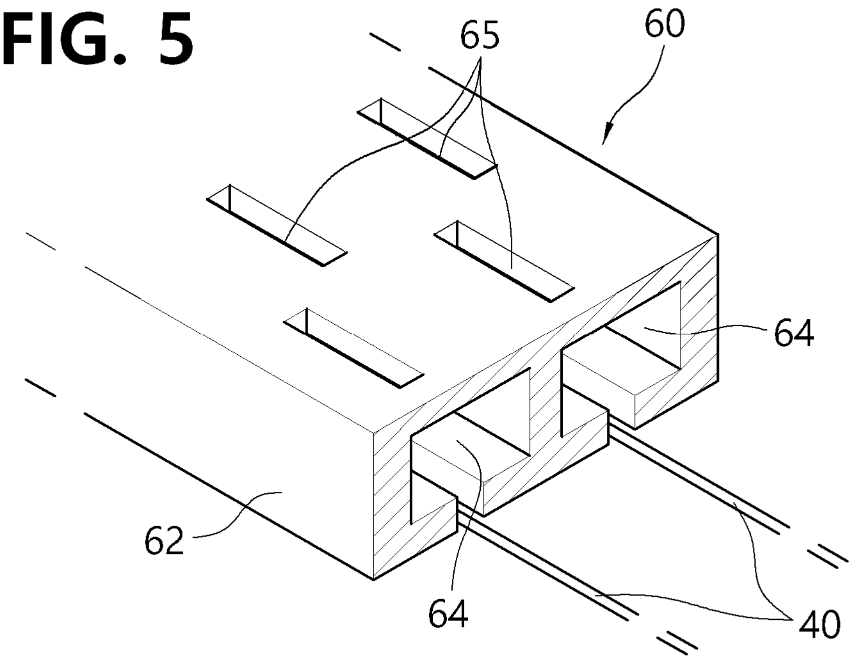
FIG. 5 is a perspective view of a second antenna module and a power feeding circuit of the vehicle antenna apparatus shown in FIG. 1. Here, the second antenna module is cut so that a waveguide formed therein can be seen.

FIG. 3 is an exploded perspective view of the vehicle antenna apparatus shown in FIG. 1. FIG. 4 is a perspective view of a second antenna module and a power feeding circuit of the vehicle antenna apparatus shown in FIG. 1. Here, the first antenna module is cut so that a waveguide and a power feeding network formed therein can be seen. FIG. 5 is a perspective view of a second antenna module and a power feeding circuit of the vehicle antenna apparatus shown in FIG. 1. Here, the second antenna module is cut so that a waveguide formed therein can be seen.

Referring to FIGS. 3 to 5, the antenna modules 50, 60 and 70 according to an embodiment of the present invention may include module bodies 52 and 62, waveguides 54 and 64, and a power feeding network 56. Here, the module bodies 52 and 62 are mounted on the printed circuit board 20. In this case, the module bodies 52 and 62 may be made of metal, for example aluminum.

In the present embodiment, the module bodies 52 and 62 are formed by stacking a plurality of plate-shaped members having a rectangular cross section and a predetermined thickness. The module body 52 of the first antenna module 50 and the module body 62 of the second antenna module 60 have different thicknesses.

More specifically, the module body 52 of the first antenna module 50 may be comprised of first to third layers 521, 522 and 523, and the module body 62 of the second antenna module 60 may be comprised of first and second layers 621 and 622.

Each of the layer 521, 522, 523, 621 and 622 of the module bodies 52 and 62 is provided with components for performing the function of the antenna modules 50 and 60. In this embodiment, the first antenna module 50 is a transmission antenna module that transmits radio wave signals to the outside, and the second antenna module 60 is a reception antenna module that receives radio wave signals from the outside.

Referring to FIGS. 3 and 4, a plurality of slots 55 having a rectangular cross section are formed in the third layer 523 of the first antenna module 50. A waveguide 54 connected to the plurality of slots 55 is formed in the second layer 522 of the first antenna module 50. Here, the cross section of the waveguide 54 has a rectangular shape, and the plurality of slots 55 in the third layer 523 are formed along the longitudinal direction of the waveguide 54.

In this embodiment, the waveguide 54 is formed to extend along the longitudinal direction of the module body 52. The number of waveguides 54 is plural, and the plurality of waveguides 54 are arranged side by side and adjacent to each other along the width direction of the module body 52.

Meanwhile, the plurality of slots 55 and waveguides 54 may be formed of known slots and waveguides. The shape and arrangement of the plurality of slots 55 and the waveguide 54 may be variously selected according to the structure, shape and function of the antenna apparatus and the characteristics of radio wave signals transmitted and received.

A power feeding network 56 is formed in the first layer 521 of the first antenna module 50. The power feeding network 56 performs a function of receiving radio wave signals from the power feeding circuit 40 and transmitting and distributing them to a plurality of waveguides 54.

Here, the power feeding network 56 formed in the first layer 521 may be formed of a known power feeding network. The power feeding network may be variously changed according to the structure, shape and function of the antenna apparatus and the characteristics of radio wave signals transmitted and received.

For example, the power feeding network 56 and the waveguide 54 may be formed together in the first and second layers 521 and 522 so that the power feeding network 56 can feed power to the side of the waveguide 54. In addition, although not shown in FIG. 4, it goes without saying that known components for transmitting and distributing radio wave signals may be additionally provided in the power feeding network 56.

Meanwhile, referring to FIGS. 3 and 4 again, the cross section of the module body 52 has a rectangular shape. In this case, the module body 52 is comprised of an inner part A1 adjacent to the printed circuit board 20, and an outer part A2 positioned farther away from the printed circuit board 20 than the inner part A1.

In this embodiment, the inner part A1 is defined as the first layer 521 in which the power feeding network 56 is formed, and the outer part A2 is defined as the second and third layers 522 and 523 in which the plurality of slots 55 and the waveguide 54 are formed. In this case, the plurality of waveguides 54 are formed over the entire area of the outer part A2 along the width direction of the module body 52.

Accordingly, the vehicle antenna apparatus 1 according to an embodiment of the present invention can efficiently transmit radio wave signals to the outside by using the entire area of the upper surface of the module body 52 for signal transmission. In addition, in the vehicle antenna apparatus 1 according to an embodiment of the present invention, since the outer part A2 does not include an unnecessary area in which the waveguide 54 is not formed, manufacturing costs can be reduced.

On the other hand, in this embodiment, the width of the inner part A1 of the module body 52 is formed to be the same as that of the outer part A2. Of course, depending on the shape of the power feeding network 56 formed in the inner part A1, the width of the inner part A1 may be smaller than that of the outer part A2. Accordingly, in the vehicle antenna apparatus 1 according to an embodiment of the present invention, since the inner part A1 does not include an unnecessary area in which the power feeding network is not formed, manufacturing costs can be reduced.

Referring to FIGS. 3 and 5, the module body 62 of the second antenna module 60 is comprised of first and second layers 621 and 622. A plurality of slots 65 having a rectangular cross section are formed in the upper surface of the second layer 622. A waveguide 64 connected to the plurality of slots 65 is formed in the first layer 621.

In this embodiment, the cross section of the waveguide 64 has a rectangular shape. A plurality of slots 65 of the second layer 622 are formed side by side along the longitudinal direction of the waveguide 64. the plurality of slots 65 and waveguides 64 may be formed of known slots and waveguides.

The waveguide 64 is formed to extend along the longitudinal direction of the module body 62. In this case, the number of waveguides 64 is plural, and the plurality of waveguides 64 are arranged side by side and adjacent to each other along the width direction of the module body 62.

One side of the waveguide 64, for example, the lower side of the waveguide 64 based on FIG. 5 is connected to the power feeding circuit 40. That is, the second antenna module 60 that can be used for reception does not require a power feeding network for transmitting radio wave signals to the outside, and thus, has a smaller height than the first antenna module.

As such, the vehicle antenna apparatus 1 according to an embodiment of the present invention may include a plurality of antenna modules 50, 60 and 70 having different shapes and structures depending on functions and roles, and these antenna modules are used to constitute transmission/reception channels, whereby it is possible to increase the degree of freedom in the design of transmission/reception channels, prevent unnecessary waste of resources, and reduce manufacturing costs.

Meanwhile, although the layers 521, 522, 523, 621 and 622 constituting the module bodies 52 and 62 in FIG. 3 are shown to have the same thickness and shape, the thickness and shape of each layer 521, 522, 523, 621 and 622 may be changed according to the function and shape of components provided in each layer 52, 522, 523, 621 and 622.

For example, the first antenna module 50 may have a more complicated power feeding network structure in order to perform a transmission function. In this case, the first layer 521 of the first antenna module 50 may have a thicker thickness in order to accommodate a more complicated power feeding network structure therein.

Figure 6:
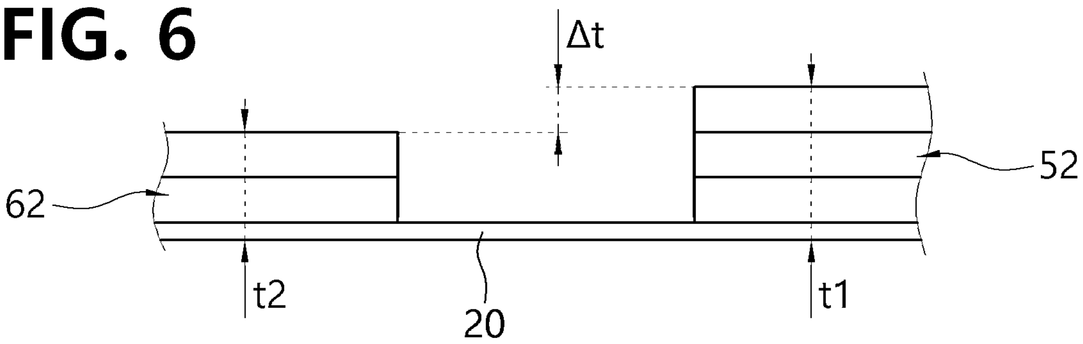
FIG. 6 is a side view of the vehicle antenna apparatus shown in FIG. 1. Here, a subprocessor is not shown.
Figure 7A:
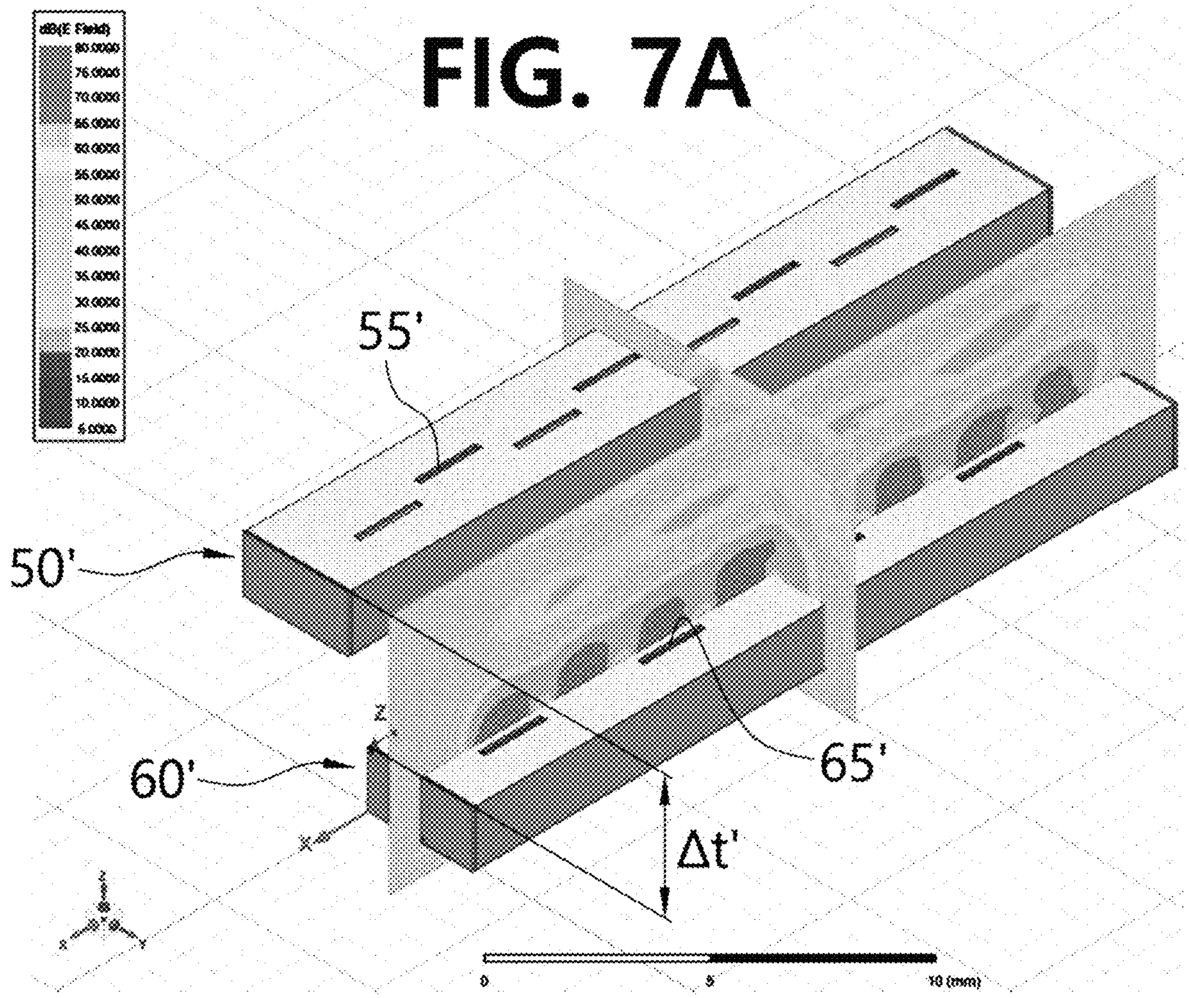
Figure 7B:
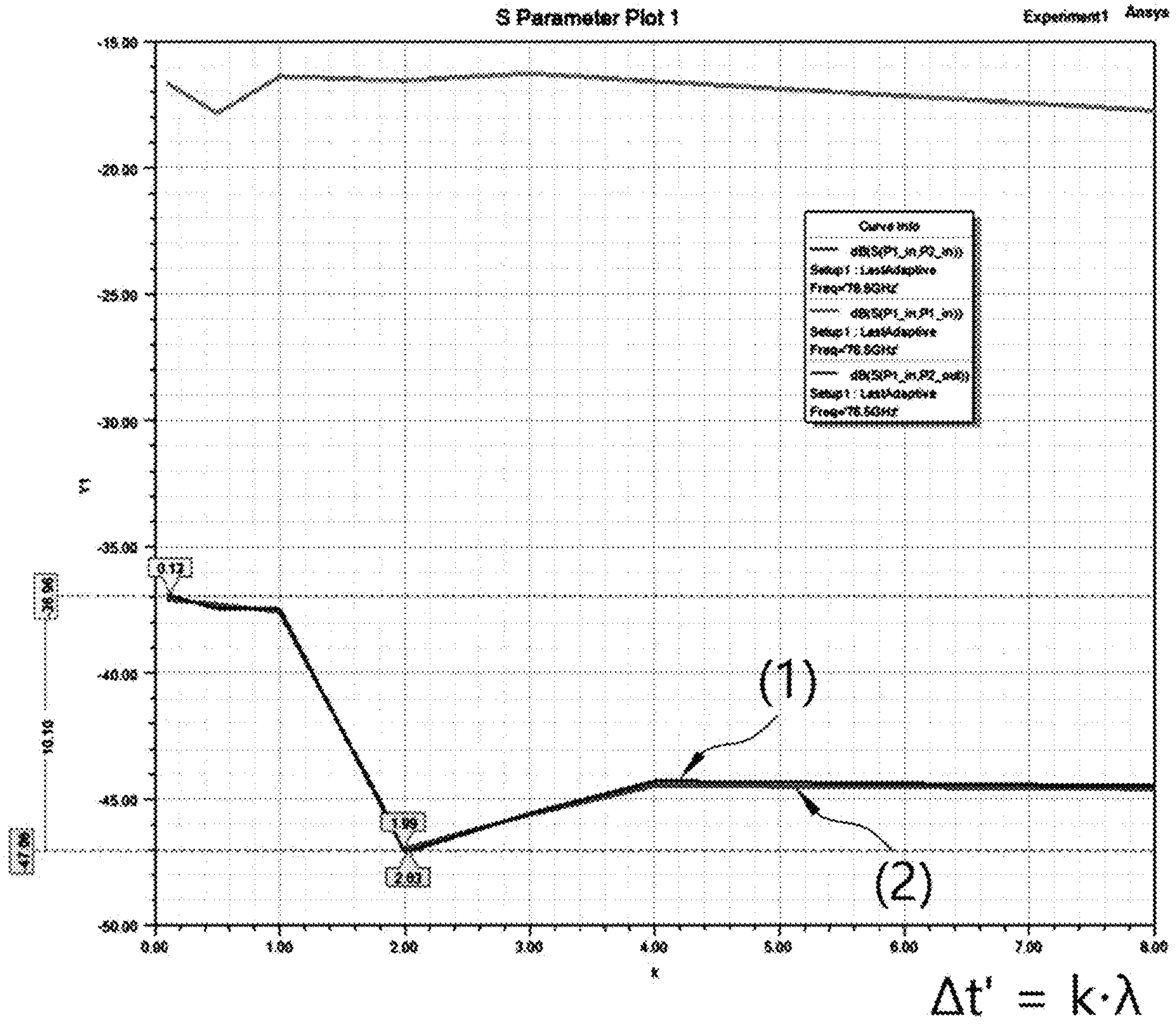

FIG. 6 is a side view of the vehicle antenna apparatus shown in FIG. 1. Here, a subprocessor is not shown. FIGS. 7A and 7B are diagrams for explaining a first experiment confirming that the vehicle antenna apparatus shown in FIG. 1 can reduce an interference effect between transmission/reception channels, wherein FIG. 7A is a schematic view of first and second experimental models modeling the vehicle antenna apparatus shown in FIG. 1, and FIG. 7B is a graph showing the experimental results of the first experiment.

As described above, the module body of the first antenna module and the module body of the second antenna module according to an embodiment of the present invention may have different thicknesses.

More specifically, referring to FIG. 6, the vertical thickness t1 of the module body 52 of the first antenna module is thicker than the vertical thickness t2 of the module body 62 of the second antenna module.

In this case, the thickness difference (Δt=t1−t2) between the module bodies 52 and 62 may be formed to have a predetermined value. For example, the thickness difference (Δt) between the module bodies 52 and 62 may be formed to have a larger value than an integer multiple (n)λ) of a wavelength (λ) of the radio wave transmitted by the antenna module.

In this embodiment, the thickness difference (Δt) between the module bodies 52 and 62 is formed to have a value equal to or greater than twice (2λ) of the wavelength (λ) of the radio wave transmitted and received by the antenna module.

The present inventors performed the following first experiment to confirm that the vehicle antenna apparatus according to an embodiment of the present invention can reduce the interference effect between transmission/reception channels.

Referring to FIG. 7A, the first and second antenna modules according to an embodiment of the present invention are modeled as a first experimental model 50' and a second experimental model 60', respectively, for the first experiment.

In this case, the first experimental model 50' is comprised of a waveguide having a rectangular cross section wherein a plurality of slots 55' through which radio waves can pass are formed on the upper surface thereof, and both ends in the x-axis direction are closed.

The second experimental model 60' has the same shape as the first experimental model 50', but is arranged so that the height at which the upper surface of the first experimental model (50') is located is different from the height at which the upper surface of the second experimental model (60') is located.

The difference between the height at which the upper surface of the first experimental model (50') is located and the height at which the upper surface of the second experimental model (60') is located can be understood as corresponding to a difference in thickness between the module bodies of the first antenna module and the second antenna module in this embodiment. Hereinafter, the height difference between the two surfaces is referred to as Δt'.

A simulation experiment was performed in which radio waves having a frequency of 76.5 GHz were emitted from the slot 55' of the first experimental model 50'. Graph (1) of FIG. 7B is a graph showing the amount of energy transferred from the first experimental model 50' to the inside of the second experimental model 60' as Δt' changes.

A simulation experiment was performed in which radio waves having a frequency of 76.5 GHz were emitted from the slot 65' of the second experimental model 60'. Graph (2) of FIG. 7B is a graph showing the amount of energy transferred from the second experimental model 60' to the inside of the first experimental model 50' as Δt' changes.

In the graph of FIG. 7B, the amount of energy of the transmitted radio waves was expressed in decibel (dB) units, and Δt' was expressed as the product (kλ) of a constant (k) and the wavelength (λ) of the radio waves emitted from the slots 55' and 65'. The scales of the first and second experimental models 50' and 60' can be confirmed using the bar indicated at the bottom of FIG. 7A.

Referring to FIG. 7B, graphs (1) and (2) show almost the same trend. In particular, the amount of energy transferred was rapidly reduced in the section where Δt' increased from λ to 2λ. The amount of energy transferred was slightly increased in the section where Δt' increased from 2λ to 4λ, but thereafter, it tended to converge to a predetermined value.

The fact that the amount of energy transferred from the first experimental model 50' to the second experimental model 60' or vice versa is small means that the amount of energy transferred from the transmission channel to the reception channel is small and thus, the interference effect is small.

These results suggest that since the vehicle antenna apparatus according to an embodiment of the present invention can configure transmission/reception channels using a plurality of antenna modules having different thicknesses, the interference effect between the transmission/reception channels can be reduced.

On the other hand, in view of the purpose and contents of the above-described first experiment, the thickness difference (Δt) between the module body 52 of the first antenna module and the module body 62 of the second antenna module in FIG. 6 may also be understood to mean a height difference between a portion of the first antenna module from which radio wave signals are transmitted to the outside and a portion of the second antenna module at which radio wave signals are received from the outside.

Figure 8A:
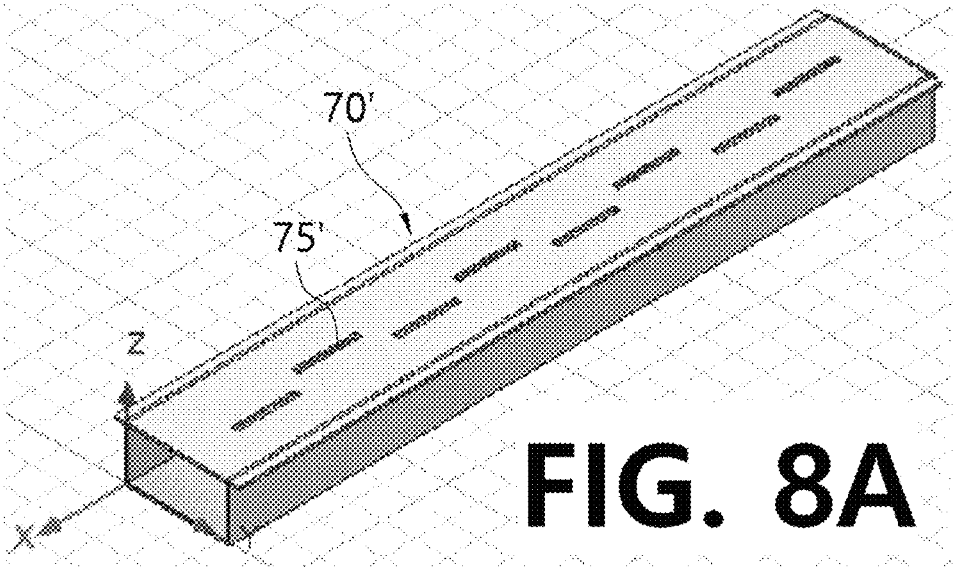
Figure 8B:
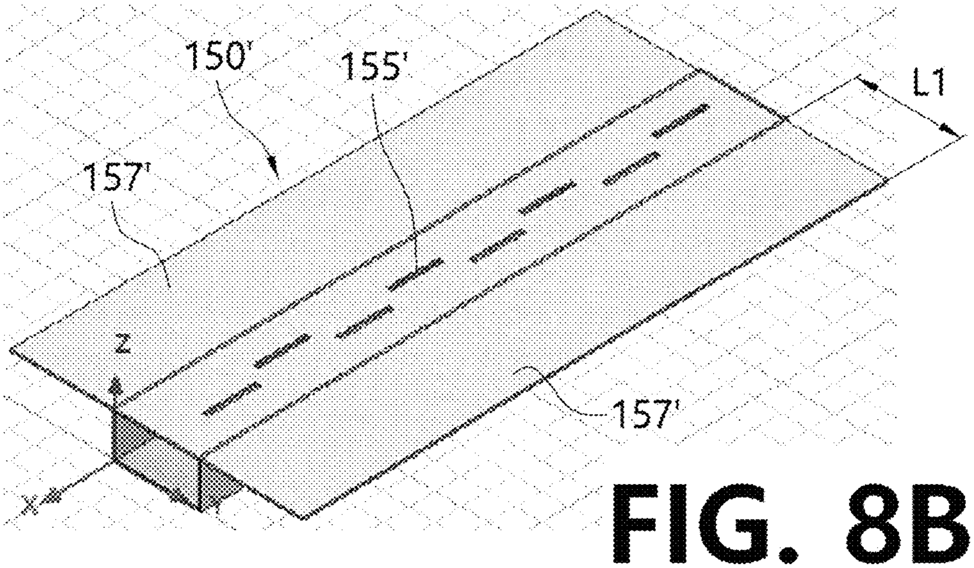
Figure 8C:
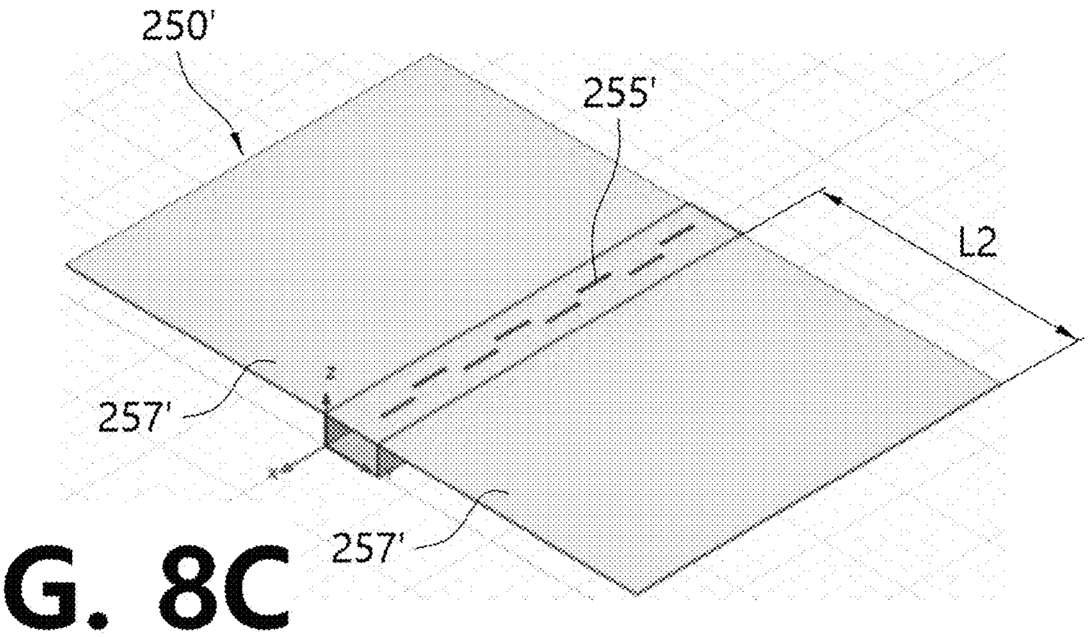
Figure 9A:
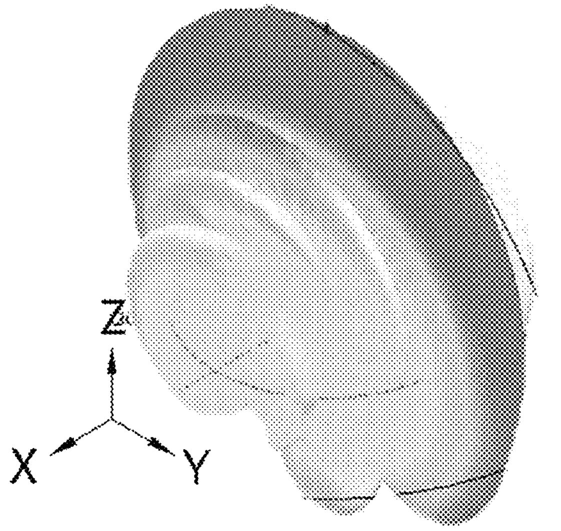
FIGS. 9A to 9C are 3D images visually expressing the experimental results of the second experiment.
Figure 9B:
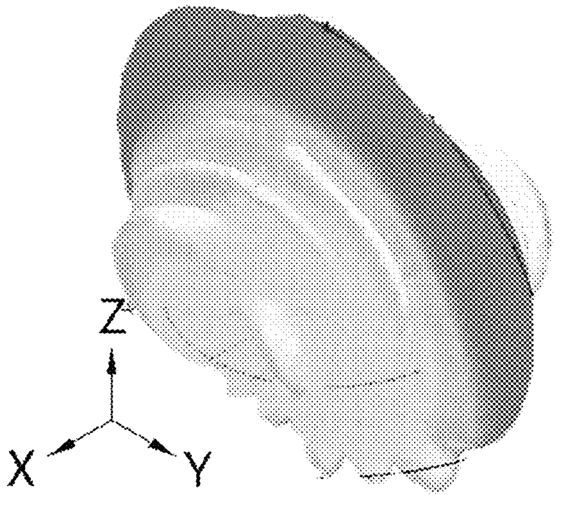
Figure 9C:
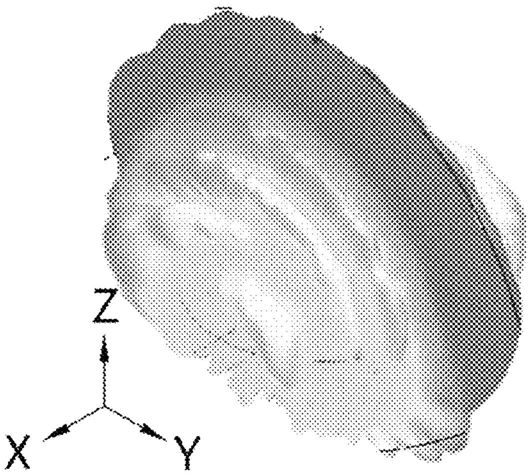
Figure 10:
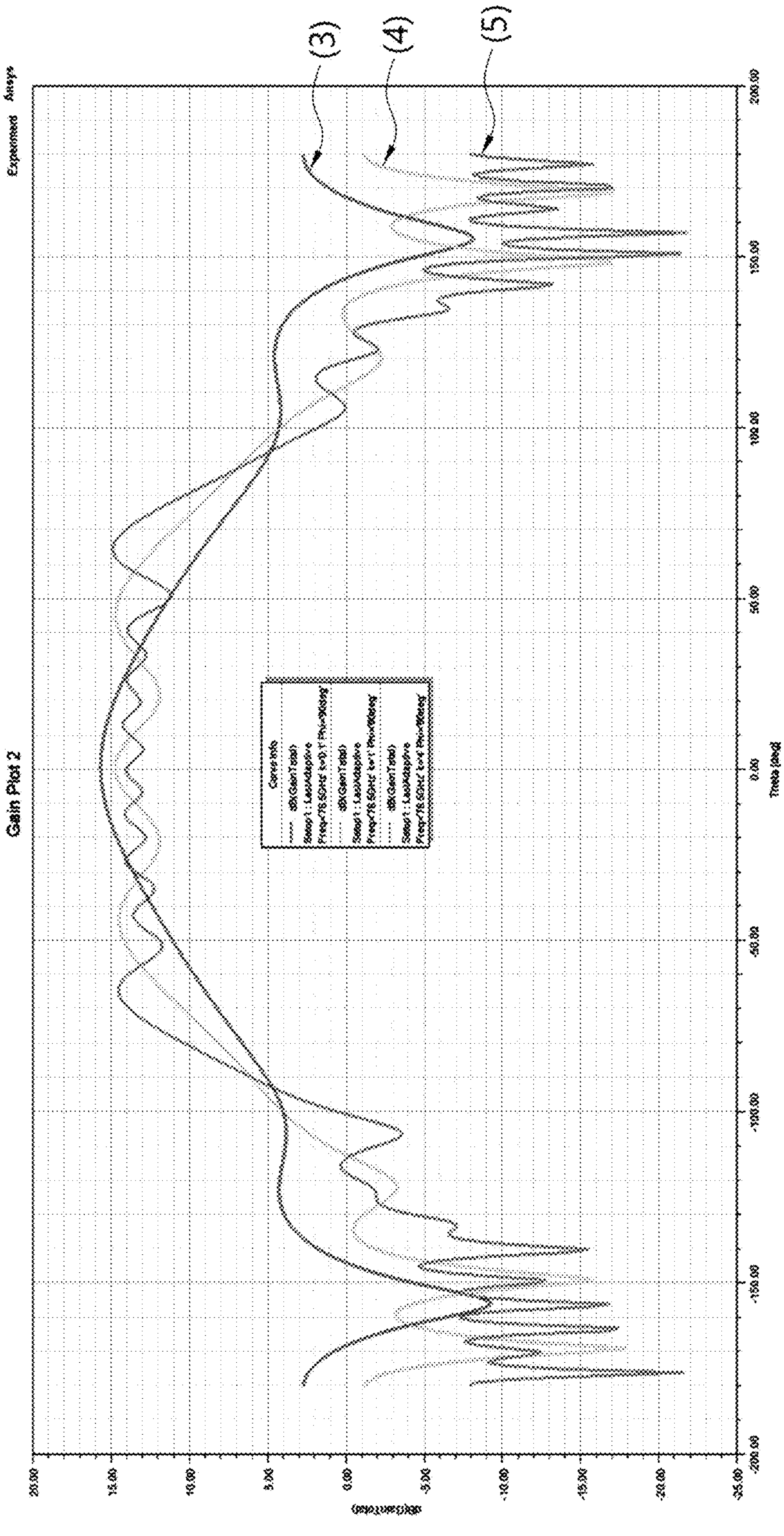

FIGS. 8A to 10 are diagrams for explaining a second experiment confirming that the vehicle antenna apparatus shown in FIG. 1 can suppress lateral waves, wherein FIGS. 8A to 8C are schematic diagrams of a third experimental model modeling the vehicle antenna apparatus shown in FIG. 1 and first and second comparison models; FIGS. 9A to 9C are 3D images visually expressing the experimental results of the second experiment, and FIG. 10 is a graph showing the experimental results of the second experiment.

Referring back to FIG. 4, as described above, in this embodiment, the plurality of waveguides 54 may be formed over the entire area of the outer part A2 of the first module body 52, and the width of the inner part A1 of the first module body 52 where the power feeding network 56 is formed is equal to or smaller than the width of the outer part A2.

The present inventors performed the following second experiment to confirm that the vehicle antenna apparatus according to an embodiment of the present invention can effectively suppress lateral waves in the course of transmitting and receiving radio wave signals.

Referring to FIG. 8A, the antenna modules according to an embodiment of the present invention is modeled as a third experimental model 70' for the second experiment. The third experimental model 70' is comprised of a waveguide having a rectangular cross section. A plurality of slots 75' through which radio waves can pass are formed on the upper surface of the waveguide.

Referring to FIG. 8B, the first comparison model 150' is comprised of a waveguide having the same shape as the third experimental model 70', wherein a frame 157' having a first length L1 is formed to extend in the lateral direction (or width direction) on the upper surface of the waveguide. That is, the upper surface of the frame 157' extends from the upper surface of the waveguide to form the same plane.

Referring to FIG. 8C, the second comparison model 250' is comprised of a waveguide having the same shape as the third experimental model 70', wherein a frame 257' having a second length L2 is formed to extend in the lateral direction (or width direction) on the upper surface of the waveguide. That is, the upper surface of the frame 257' extends from the upper surface of the waveguide to form the same plane. Here, the second length L2 is longer than the first length L1.

A frame or ground provided in a conventional waveguide array antenna can be understood as a configuration corresponding to the frames 157' and 257' of the first and second comparison models 150' and 250'.

By performing a second experiment comparing the first and second comparison models 150' and 250' including the frames 157' and 257' with the third experimental model 70', it is possible to confirm the effect of the frame or ground extending laterally to the side of the waveguide in the conventional waveguide array antenna.

A simulation experiment was performed in which radio waves having a frequency of 76.5 GHz were radiated from the slot 75' of the third experimental model 70'. FIG. 9A is a 3D image visually representing a gain pattern formed around the third experimental model 70' as radio waves are radiated from the slot 75' of the third experimental model 70'. Graph (3) of FIG. 10 is a graph showing a gain pattern formed around the third experimental model 70' as radio waves are radiated from the slot 75' of the third experimental model 70' with respect to a relative amount of energy and a rotation angle.

A simulation experiment was performed in which radio waves having a frequency of 76.5 GHz were radiated from the slot 155' of the first comparison model 150'. FIG. 9B is a 3D image visually representing a gain pattern formed around the first comparison model 150' as radio waves are radiated from the slot 155' of the first comparison model 150'. Graph (4) of FIG. 10 is a graph showing a gain pattern formed around the first comparison model 150' as radio waves are radiated from the slot 155' of the first comparison model 150' with respect to a relative amount of energy and a rotation angle.

A simulation experiment was performed in which radio waves having a frequency of 76.5 GHz were radiated from the slot 255' of the second comparison model 250'. FIG. 9C is a 3D image visually representing a gain pattern formed around the second comparison model 250' as radio waves are radiated from the slot 255' of the second comparison model 250'. Graph (5) of FIG. 10 is a graph showing a gain pattern formed around the second comparison model 250' as radio waves are radiated from the slot 255' of the second comparison model 250' with respect to a relative amount of energy and a rotation angle.

Referring to FIGS. 9A to 10, it can be confirmed that the gain pattern (shown in FIG. 9A) and graph (3) (shown in FIG. 10) obtained by radio waves radiated from the slots of the third experimental model have a smooth shape with smaller irregularities compared to the gain patterns (shown in FIGS. 9B and 9C) and graphs (4) and (5) (shown in FIG. 10) obtained by radio waves radiated from the slots of the first and second comparison models.

Comparing the gain patterns (shown in FIGS. 9B and 9C) and graphs (4) and (5) (shown in FIG. 10) obtained by radio waves radiated from the slots of the first and second comparison models with each other, it can be seen that as the length of the frame formed on the side of the waveguide increases, the unevenness of the gain pattern increases and has an irregular shape.

These results suggest that in the third experimental model, no frame is formed in the width direction on the side of the waveguide, so disturbance by lateral waves occurs less than in the first and second comparison models in the process of radiating the radio wave signals.

Referring back to FIGS. 4 and 8A to 8C, in the vehicle antenna apparatus according to an embodiment of the present invention, a plurality of waveguides 54 are formed over the entire area of the outer part A2 of the module body 52, and the inner part A1 of the module body 52 has a width equal to or smaller than that of the outer part A2.

That is, the side of the module body 52 according to an embodiment of the present invention does not include an area where the waveguide 54 is not formed like the frames 157' and 257' of the first and second comparison models 150' and 250' (a portion corresponding to the conventional frame or ground). Therefore, the vehicle antenna apparatus according to an embodiment of the present invention can effectively suppress generation of lateral waves in the process of transmitting and receiving the radio wave signals.

As described above, in the vehicle antenna apparatus according to an embodiment of the present invention, the antenna module having a smaller area than the printed circuit board is mounted while covering only a portion of the printed circuit board, and no metal frame (or ground) is included to cover other portions of the printed circuit board, whereby the cost required for manufacturing the antenna apparatus can be drastically reduced.

In addition, in the vehicle antenna apparatus according to an embodiment of the present invention, any other components may be additionally provided in an area where the antenna module is not mounted, thereby increasing space utilization inside the radar.

Further, the vehicle antenna apparatus according to an embodiment of the present invention may include a plurality of antenna modules whose arrangement, shape and height can be freely changed, and the plurality of antenna modules may be used to configure transmission/reception channels, whereby it is possible to increase the degree of freedom in the design of the transmission/reception channels and to efficiently utilize the internal space of the vehicle radar in which the antenna apparatus is installed.

Further, in the vehicle antenna apparatus according to an embodiment of the present invention, transmission/reception channels may be configured using a plurality of antenna modules having different heights, thereby reducing an interference effect between the transmission/reception channels.

In addition, in the vehicle antenna apparatus according to an embodiment of the present invention, a plurality of waveguides are formed over the entire area of the outer part of the module body, so that unnecessary areas where no waveguides are formed are not included, and the inner part of the module body has a width smaller than or equal to that of the outer part, whereby it is possible to suppress generation of lateral waves in the process of transmitting and receiving radio wave signals.

Hereinafter, a vehicle according to an embodiment of the present invention will be described.

Figure 11:
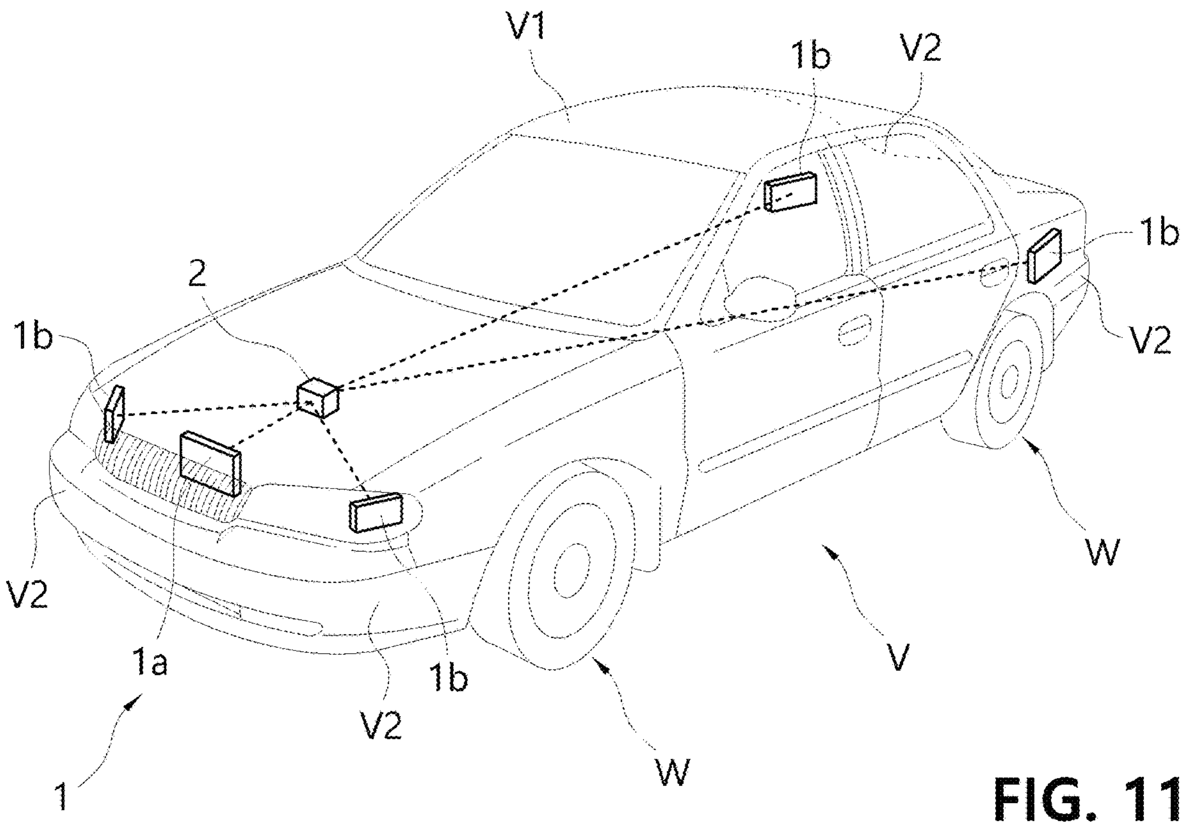
FIG. 11 is a perspective view of a vehicle according to an embodiment of the present invention. Here, a radar system seen through a body of the vehicle is shown by a dotted line.
Figure 12:
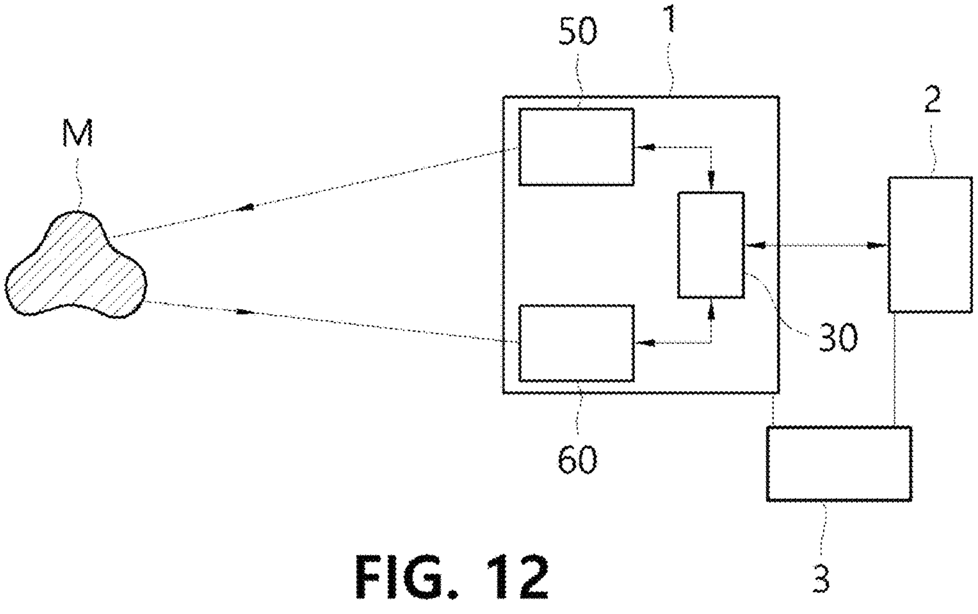
FIG. 12 is a diagram for explaining a process of obtaining information on an external object by a radar system according to an embodiment of the present invention.

FIG. 11 is a perspective view of a vehicle according to an embodiment of the present invention. Here, a radar system seen through a body of the vehicle is shown by a dotted line. FIG. 12 is a diagram for explaining a process of obtaining information on an external object by a vehicle radar system according to an embodiment of the present invention.

Referring to FIG. 11, a vehicle according to an embodiment of the present invention may include: a vehicle body V provided with an accommodation space in which a driver can ride while other components of the vehicle are installed; a pair of wheels W provided in each of the front and rear sides of the vehicle body V; and radar systems 1 and 2 provided in the vehicle body V.

In this embodiment, the vehicle body V may include: a central portion V1 provided with the main components of the vehicle and the accommodation space; and a plurality of corner portions V2 provided along the circumference of the central portion V1.

In this embodiment, the corner portion V2 of the vehicle body V may convexly protrude outward from the central portion V1 when viewed from above. Accordingly, in the present embodiment, the vehicle body V may have a rectangular shape as a whole when viewed from above, and the plurality of corner portions V2 may constitute corners of the rectangular shape, respectively.

The other components of the vehicle may include various known components, such as an engine generating driving force for moving the vehicle, a transmission transmitting the driving force generated from the engine to the wheels W, a steering system capable of controlling a driving direction of the vehicle, and an accelerator and brake system capable of controlling a speed of the vehicle.

Meanwhile, referring to FIGS. 11 and 12, in this embodiment, the radar systems 1 and 2 may include a vehicle antenna apparatus 1, a main processor 2, and a power supply unit 3 configured to supply power to the antenna apparatus 1 or the main processor 2.

According to this embodiment, the antenna apparatus 1 may be configured in the same manner as the antenna apparatus 1 described above with reference to FIGS. 1 to 10, and thus, the description thereof is replaced with the description of the antenna apparatus described above.

According to this embodiment, the antenna apparatus 1 may include a front antenna apparatus 1*a* and a plurality of corner antenna apparatuses 1*b*. The antenna apparatus 1 may be installed in the vehicle body V by a separately provided installation member (not shown), for example, a bracket.

As shown in FIG. 11, in this embodiment, the front antenna apparatus 1*a* may be installed in a front portion of the vehicle body V to acquire information on an object located in a forward direction of the vehicle.

In this case, since the forward direction of the vehicle is the most important direction in driving, a plurality of front antenna apparatuses 1*a* may be provided to more accurately obtain information on external objects.

For example, although not shown, the front antenna apparatus 1*a* may include a short-distance front antenna apparatus for collecting information on an external object located at a relatively short distance, and a long-distance front antenna apparatus for collecting information on an external object located at a relatively long distance.

In addition, in this embodiment, the plurality of corner antenna apparatuses 1*b* may be respectively located at the plurality of corner portions V2 of the vehicle body V described above to acquire information on objects located outside the corner portion V2.

As such, since the corner antenna apparatuses 1*b* are provided at the corner portion V2 of the vehicle body V, information on the distance from the corner portions V2 to the external object, etc. can be collected and used for driving the vehicle.

Accordingly, according to the present embodiment, the possibility of collision of the corner portion V2 protruding outward can be reduced. In addition, since the plurality of antenna apparatuses 1 can collect information on one external object together, the resolution of information on the object can be increased. Meanwhile, the information on the object may include a distance from the vehicle to the object, an angle with the object, and a speed of the object.

Hereinafter, a process of acquiring information on an object by the radar systems 1 and 2 according to the present embodiment will be briefly described.

Referring to FIGS. 11 and 12, a certain object M may be located outside the radar systems 1 and 2 according to an embodiment of the present invention. For example, the object M may be a pedestrian, another vehicle, or a structure installed on a road, etc.

The radar systems 1 and 2 according to this embodiment may include the antenna apparatus 1 as described above. In this embodiment, the first antenna module 50 and the second antenna module 60 of the antenna apparatus 1 may be an antenna module for transmission and an antenna module for reception, respectively.

As shown, the first antenna module 50 may emit a predetermined signal, for example, an electromagnetic wave toward the object M. Hereinafter, this electromagnetic wave is referred to as a transmission wave. The second antenna module 60 may receive the electromagnetic wave emitted from the first antenna module 50 and reflected by the object M. Hereinafter, this electromagnetic wave is referred to as a reception wave.

The reception wave is converted into an electrical signal in the second antenna module 60 and transmitted to the subprocessor 30 of the antenna apparatus 1. In this case, in this embodiment, the subprocessor 30 may be comprised of a radar IC.

In this embodiment, the subprocessor 30 may process the transmission wave and the reception wave based on information thereon. For example, the subprocessor may convert the transmission wave and the reception wave into an intermediated frequency (IF) signal.

Further, in this embodiment, the subprocessor 30 may digitize the IF signal. In other words, the subprocessor 30 may perform a function of an analog-to-digital converter (ADC).

Meanwhile, in this embodiment, the subprocessor 30 may be electrically connected to the main processor 2 to transmit the digitized signal. In this embodiment, the main processor 2 may perform fast Fourier transform (FFT) on the received signal.

In this case, the main processor 2 may perform 1st to nth order Fourier transform on the received signal (n is an integer of 2 or more). In addition, the main processor 2 may also perform fast Fourier transform together on a plurality of signals received through different channels.

Through the above process, the radar systems 1 and 2 according to the present embodiment can obtain information on a distance between the external object M and the radar system 1 and 2, an angle with the object M, or a moving speed of the object M.

Meanwhile, in the present embodiment, the plurality of antenna apparatuses 1 are configured to be electrically connected to one main processor 2, but in other embodiments, a plurality of main processors 2 may be provided to correspond to the plurality of antenna apparatuses 1.

It will also be possible to ensure that all functions performed by the main processor 2 according to this embodiment are implemented by the subprocessor 30 of the antenna apparatus 1.

Furthermore, the above-described process is only an example of a process in which the radar systems 1 and 2 according to an embodiment of the present invention acquire information on the object M, and the radar systems 1 and 2 according to an embodiment of the present invention may be applied to various processes of obtaining information on the external object M using the antenna apparatus 1 in addition to the above-described process.

Although an embodiment of the present invention have been described, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

DESCRIPTION OF REFERENCE NUMERALS AND SYMBOLS

1: vehicle antenna apparatus
2: main processor
3: power supply unit
V: vehicle body
10: housing
20: printed circuit board
30: subprocessor
40: power feeding circuit
50: first antenna module
60: second antenna module
70: third antenna module

The invention claimed is:

1. A vehicle antenna apparatus for transmitting and receiving radio waves, the vehicle antenna apparatus comprising:
- a printed circuit board provided in a vehicle;
- a subprocessor mounted on the printed circuit board; and
- antenna modules electrically connected to the subprocessor, covering a portion of the printed circuit board, and mounted on one surface of the printed circuit board,
- wherein the antenna modules include a first antenna module and a second antenna module,
- wherein the first antenna module is formed to have a thickness greater than that of the second antenna module,
- wherein the first antenna module and the second antenna module are located on the one surface of the printed circuit board,
- wherein a difference in thickness between the first and second antenna modules is greater than or equal to twice (2λ) the wavelength (λ) of the radio wave transmitted and received by the antenna modules, and
- wherein the first antenna module is an antenna module for transmission, and the second antenna module is an antenna module for reception.

2. The vehicle antenna apparatus according to claim 1, wherein one surface of the antenna modules mounted on the printed circuit board has a second area smaller than a first area of the printed circuit board.

3. The vehicle antenna apparatus according to claim 2, wherein the antenna modules are located inside the edge of the printed circuit board so as not to protrude to the side of the printed circuit board.

4. The vehicle antenna apparatus according to claim 1, wherein the subprocessor is located on the one surface of the printed circuit board.

5. The vehicle antenna apparatus according to claim 4, wherein the subprocessor is disposed in the center of the printed circuit board, and the antenna modules are disposed to be spaced apart from the subprocessor.

6. The vehicle antenna apparatus according to claim 1, wherein each of the antenna modules includes:
- a module body mounted on the printed circuit board;
- a waveguide formed in the module body and having a plurality of slots formed along a longitudinal direction; and
- a power feeding network formed inside the module body to connect the waveguide and the subprocessor.

7. The vehicle antenna apparatus according to claim 6, wherein the number of the waveguide is plural, and
- the plurality of waveguides are arranged side by side and adjacent to each other.

8. The vehicle antenna apparatus according to claim 7, wherein the module body includes an inner part adjacent to the printed circuit board, and an outer part positioned farther away from the printed circuit board than the inner part; and
- the plurality of waveguides are formed within the outer part, and arranged side by side and adjacent to each other along the width direction of the module body.

9. The vehicle antenna apparatus according to claim 8, wherein the power feeding network is located in the inner part, and
- a width of the inner part is smaller than or equal to a width of the outer part.

10. A radar system comprising:
- a vehicle antenna apparatus installed in a vehicle and configured to transmit and receive radio waves; and
- a power supply unit configured to supply power to the vehicle antenna apparatus,
- wherein the vehicle antenna apparatus includes:
- a printed circuit board provided in the vehicle;
- a subprocessor mounted on the printed circuit board; and
- antenna modules electrically connected to the subprocessor, covering a portion of the printed circuit board and mounted on one surface of the printed circuit board,
- wherein the antenna modules include a first antenna module and a second antenna module,
- wherein the first antenna module is formed to have a thickness greater than that of the second antenna module,
- wherein the first antenna module and the second antenna module are located on the one surface of the printed circuit board, and
- wherein a difference in thickness between the first and second antenna modules is greater than or equal to twice (2λ) the wavelength (λ) of the radio wave transmitted and received by the antenna modules, and
- wherein the first antenna module is an antenna module for transmission, and the second antenna module is an antenna module for reception.

11. The radar system according to claim 10, further including a main processor provided outside the vehicle antenna apparatus so as to be electrically connected to the subprocessor.

12. A vehicle comprising:
- a vehicle body; and
- a vehicle antenna apparatus provided in the vehicle body and configured to transmit and receive radio waves,
- wherein the vehicle antenna apparatus includes:
- a printed circuit board provided in the vehicle body;
- a subprocessor mounted on the printed circuit board; and
- antenna modules electrically connected to the subprocessor, covering a portion of the printed circuit board and mounted on one surface of the printed circuit board,
- wherein the antenna modules include a first antenna module and a second antenna module,
- wherein the first antenna module is formed to have a thickness greater than that of the second antenna module, wherein the first antenna module and the second antenna module are located on the one surface of the printed circuit board, and wherein a difference in thickness between the first and second antenna modules is greater than or equal to twice (2λ) the wavelength (λ) of the radio wave transmitted and received by the antenna modules, and wherein the first antenna module is an antenna module for transmission, and the second antenna module is an antenna module for reception.

13. The vehicle according to claim 12, wherein the vehicle antenna apparatus is provided in plurality, and the plurality of vehicle antenna apparatuses are arranged to be spaced apart from each other along the circumference of the vehicle body.

14. The vehicle according to claim 13, wherein the vehicle body includes:

a central part; and a plurality of corner parts protruding outward from the central part, and wherein the plurality of vehicle antenna apparatuses include:

a front antenna apparatus provided in a front part of the vehicle body; and a plurality of corner antenna apparatuses respectively provided in the plurality of corner parts.

* * * * *